UNITED STATES PATENT OFFICE.

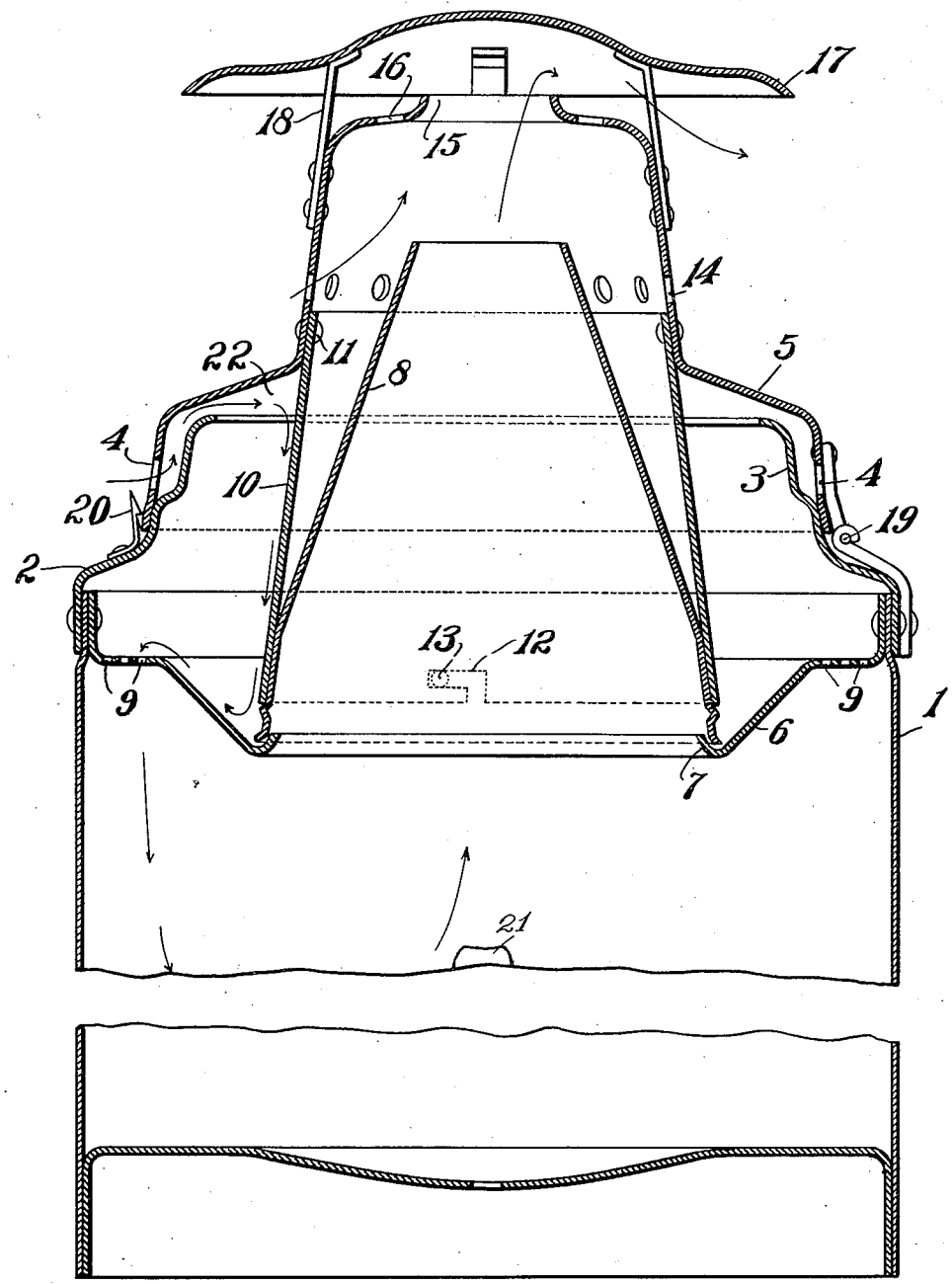

CLINTON O. HARRINGTON, OF MELROSE, MASSACHUSETTS, ASSIGNOR TO PETER GRAY & SONS, INC., A CORPORATION OF MASSACHUSETTS.

LANTERN.

1,011,779. Specification of Letters Patent. Patented Dec. 12, 1911.

Application filed November 26, 1909. Serial No. 529,936.

*To all whom it may concern:*

Be it known that I, CLINTON O. HARRINGTON, a citizen of the United States, residing in Melrose, county of Middlesex, Commonwealth of Massachusetts, have invented certain new and useful Improvements in Lanterns, of which the following is a specification, reference being had to the drawings accompanying the same and forming a part thereof.

My invention relates to lanterns, particularly of the class used in the open air and subjected to high wind velocity and great variations of temperature.

The objects of my invention are to produce a lantern wherein the air to support combustion may be taken from the top through indirect passages; to so form and arrange the air inlets that the incoming cold air currents will be quieted before entering the body of the lantern in order to protect the flame from direct air currents and prevent it from flickering or being extinguished.

Another object of my invention is to construct the top and body of the lantern so that the incoming cold air currents will not come in contact with the heated portions of the top of the lantern, thus to prevent condensation upon the lenses of the lantern of the moisture held in suspension by warm air within the lantern. As before stated, these objects are obtained by preventing the warm air from coming in direct contact with the heated surface of the cone through which the products of combustion make their escape to the top of the lantern, the contact of cold air with the cone being prevented by surrounding the inner cone by an outer shield, leaving an air space between the two, and providing air inlets from the outside of the lantern communicating with the air space between the cone and outer shield. By this arrangement the outer cone is kept at a temperature approximating that of the open air. The cold air is conducted from the air inlets in the lower wall of the annular air space, down contiguous to the body of the lantern, to the flame of the lamp so that whatever moisture there may be in the incoming cold air will be carried with it to the flame.

In the drawings illustrating my invention and forming a part of this specification—

Figure 1 is a sectional elevation of a lantern body showing the interior construction of the body and the top of the lantern.

In the illustration, 1 represents the body of a lantern; 2 is a continuation of the body 1 and is secured to it in any suitable manner. The portion 2 is provided with an upwardly and inwardly curving portion which covers the air inlets 4 formed in the lantern top 5. There is also secured to the body of the lantern the inwardly projecting portion 6 which is provided with a curved flange 7 arranged to fit under the cone 8 and form a more or less air-tight closure therewith. The portion 6 is provided with perforations 9, 9, etc., which form inlets for the ingress of cold air to the body of the lantern and thence to the flame to support combustion. The perforations 9, 9, etc., are close to the body 1 of the lantern to thereby compel the incoming currents of air to enter the body of the lantern near the walls and remote from the upward currents of heated air, in order that they may be kept cool and not give off moisture to cause sweating on the interior walls of the lantern. The shield 10 is secured to the top 5 by rivets 11, or it may be secured in any other suitable manner. The shield 10 is provided with L-shaped slots 12, adapted to removably receive the pins 13, the pins 13 being secured in the walls of the cone 8, thus removably securing the cone 8 to the bottom of the shield 10. The top 5 is provided with air inlets 14, 14, etc., above the point where the shield 10 is secured to said top 5. The upper portion of the top 5 is curved inwardly to provide a central opening 15, and is provided with air inlets 16, 16, etc. The canopy top 17 may be secured to the top 5 by means of brackets 18, 18, etc. In order to remove the cone 8 and clean it and the interior of the top 5, said top 5 is secured to the body by a suitable hinge, as 19, fastened to one side, and a catch 20 at the other. The catch may be of any suitable form.

The arrows shown in the drawing illustrate the currents of air coming in to the lantern to support combustion, and show that as the currents of air come in through the inlets 4, they are deflected upwardly by the shield 3 to the top of the annular air space 22, flow thence inwardly and against the shield 10, following it down to the end of said shield, and are thence deflected upwardly to the air inlet holes 9, and downwardly to the body of the lantern. It is obvious that it is impossible to get a direct current of air to the flame which is represented as 21, to cause it to flicker or extinguish it. The air currents are quieted by the indirect passages above noted and cannot blow directly upon the flame. The air as it comes in the inlets 4 is prevented from coming in contact with the cone 8 by the surrounding shield 10. The incoming air is directed to the inlets 9 which are located near the body of the lantern, so that the cold air will fall in a line substantially contiguous to the outer shell or body of the lantern until it reaches its bottom and be thence drawn to the flame by the upward movement of the warm air induced by combustion.

The air inlets 14 are provided for two purposes, one of which is to keep the upper end of the cone 8 as cool as possible, and the other is to provide an auxiliary supply of air to the outlet 15, so that strong currents of air passing under the canopy top 17 would not tend to create a suction through the outlet 15 by cross currents of air passing under the canopy, the auxiliary supply of air being drawn in through the outlets 14.

Applicant does not confine himself to the specific construction or form of the parts shown in the drawing as the form and arrangement of the parts may be considerably varied without departing from the spirit of the invention, the invention residing more particularly in providing indirect air inlet passages and an air space between the outer shield and the cone through which the products of combustion escape.

What I claim is—

1. In a lantern, the combination of a body part having air inlets near the top; a shield secured to the top of the body part above said air inlets and extending downwardly into said body part to form an annular air space between it and the body part; a cone removably secured to the shield at its lower end and extending upwardly inside said shield so as to leave an air space between it and the shield; and a closure for the bottom of the annular air space having perforations only near its outer edge contiguous to the body of the lantern.

2. A lantern, comprising a body part and an inner shield arranged to form an annular air space; air inlets in the body of the lantern leading to said annular air space; an upwardly and inwardly curving shield covering said air inlets and formed to leave an air space between said shield and the body part; a closed top to said annular air space; a bottom to said annular air space having a substantially horizontal portion provided with air inlets; a central cone extending upwardly near the top of the lantern to provide an escape for the products of combustion; an air space between said central cone and the shield; air inlets in the top of the lantern leading to said last mentioned air space; a central opening in the lantern top; and a canopy covering said central opening.

3. In a lantern, a body part; a top hinged to said body part having air inlets near its bottom edge; an inwardly and upwardly curving shield covering said air inlets; an inner shield secured to said hinged top; a cone removably secured to said inner shield; and an annular plate secured at its outer edge to the body part, its inner edge partially surrounding the lower edge of the cone, said annular plate being provided with air inlets near its outer edge.

4. In a lantern, a body part; a top hinged to said body part, arranged to swing upwardly and outwardly; a shield secured to said hinged top and extending downwardly into the body of the lantern; and a cone removably secured to said shield near their bottom edges and arranged to leave an air space between the cone and the shield.

5. In a lantern, a body part having two series of air inlets near the top; a shield secured to the top between said series of air inlets and extending downwardly into the body of the lantern to form an annular air space between said shield and the body of the lantern; a guard formed in the body of the lantern extending upwardly above the lower series of air inlets; a closure for the bottom of the annular air space having perforations in its horizontal portion; an inner cone removably secured at the bottom edge of the shield and arranged to have an annular air space between it and said shield.

6. In a lantern, a body part having a series of air inlets near its top; a shield secured to the top above said air inlets and arranged to form an annular air space between its outer walls and the body of the lantern; an inner cone secured to the bottom of said shield arranged to form an air space between it and the shield; a closure for the bottom of the annular air space extending inwardly around the lower end of the cone and having a hole in its center, its outer edge being permanently secured to the body part of the lantern; and a series of perforations in said closure.

In testimony whereof, I have hereunto set my hand, in the presence of two subscribing witnesses, this the 18th day of November, A. D. 1909.

CLINTON O. HARRINGTON.

Witnesses:
R. P. ELLIOTT,
H. M. KELSO.